3,219,622
PROCESS FOR THE PURIFICATION AND STABILIZATION OF POLY-ALPHA-OLEFINS
Luciano Luciani, Piero Manaresi, and Silvio Bianchi, Ferrara, Italy, assignors to Montecatini Società Generale per l'Industria Mineraria e Chimica, Milan, Italy, a corporation of Italy
No Drawing. Filed May 11, 1962, Ser. No. 194,154
Claims priority, application Italy, May 16, 1961, 9,118/61
7 Claims. (Cl. 260—45.95)

The present invention relates to a process for the purification and stabilization of alpha-olefin polymers obtained with the aid of stereospecific catalysts.

Processes for obtaining solid polymers of ethylene, propylene and other alpha-olefins, which polymers exhibit a high linearity and regularity of structure associated in general with a high crystallinity, are known and widely used.

Such valuable polymers are obtained with new types of catalytic systems which are active at low pressures and are called "stereospecific" or "co-ordinated" catalysts. These catalysts generally are made up of the reaction product obtained from a metallorganic compound and a transition metal compound. (For this purpose, metallorganic aluminum compounds reacted with titanium compounds are widely used.)

Although with the aid of improved catalytic systems which are particularly active it is presently possible to obtain high productivity from such catalysts so as to obtain polymers containing a minimum amount of catalytic residues, a certain amount of metallic compounds used as catalysts always remains in the final polymer and is found in the ash.

In addition, during the various operations in preparation and finishing of the polymers (unless expensive corrosion-proof apparatuses are used), traces of metal compounds are incorporated in the polymer (e.g., of iron), which metal compounds result from corrosion of the reaction equipment.

As a matter of fact, reaction of the catalytic residues with water or with compounds containing active hydrogen results in the formation of an acid medium which can cause corrosion of the metal equipment.

It has also been found that the presence of metal residues in the polymer, whether from the catalyst or produced by corrosion, does not merely result in the formation of a given ash content. In fact, even if (by operating with catalytic systems having a very high activity or by suitably treating the polymers) the ash content is reduced to a value below that which in general is dangerous (e.g., below 0.1% by weight), metallic residues still remain in the polymer, which residues, through mechanisms which are not altogether clear, cause phenomena of instability of the polymer with time (e.g., by lowering its resistance to heat, light and oxidation), therefore resulting in a more or less intense discoloring of the polymer. Even if the polymer is stabilized, the presence of metal residues does result in such discoloration with time.

It is therefore desirable to remove, with suitable treatment, most of the residual catalyst, at the same time avoiding the formation of a corrosive medium which causes further pollutions. It is also desirable to devise a method to inactivate (as far as the instability of the polymer, the coloring, and the color change are concerned) residual metal compounds, even if in minimum amounts, in the polymer.

Processes for purifying crude polymer are known, which processes comprise inactivating the catalytic residues by treatment with a suitable agent which is also capable of solubilizing or removing the catalyst components after transforming them into inert compounds.

Such suitable agents include compounds containing an active hydrogen, such as water, mono- and poly-hydroxyl alcohols, enol-type compounds, etc., which compounds may be associated with compounds capable of forming soluble complexes with metals of the catalyst, e.g., tartaric acid, citric acid, ethylenediamino-tetracetic acid, acetylacetone, etc. Particularly widely used methods involve washing with water (which is often either alkaline or acidic), or with aliphatic alcohols, e.g., containing from about 1 to 8 carbon atoms.

In order to neutralize the acidity developed with such treatments, washing with alkaline agents was frequently adopted: e.g., gaseous $NH_3$, hydroxides, carbonates, basic salts, alkoxides of alkaline or alkaline-earth metals, amines, ethanolamines, etc.

This treatment, however, requires further careful washing treatments in order to remove any traces of alkaline medium, which treatments do not eliminate inconveniences of the second type (instability and color change) in the finished polymer. On the contrary, frequently the polymer is "sensitized" as regards these latter inconvenieces, if the basic substance and its reaction products have not been completely removed.

A particular process has now been found for purifying the crude polymer, which process reduces the aforementioned inconveniences relating to ash content, corrosion and the phenomena of instability, coloring and color change.

An object of the present invention is therefore the development of an improved process for purifying solid polymers of ethylene or alpha-olefins, which polymers have been obtained with the aid of stereospecific catalysts of a metallorganic compound and a transition metal compound, which process avoids pollution of the polymer by the metal from metal apparatuses due to the action of free acidity, and which reduced the ash content of the final polymer.

A further object of the invention is to provide a method for improving the stability and color, as well as the color change in the presence of "staining" stabilizers, of ethylene or alpha-olefin polymers obtained with the aid of the aforementioned catalytic systems.

It has, in fact, been found that by treating, in the absence of air and moisture, a crude polymer with a mono- or polyvalent alcohol, which alcohol contains dissolved therein a substituted aliphatic polyvalent alcohol, in which one or more hydrogen atoms of the hydroxyls are substituted with an alkaline or alkaline-earth metal, all of the aforementioned objects are reached.

Suitable alcohol solvents include aliphatic alcohols containing from about 1 to 10 carbon atoms, aliphatic glycols, glycerol, etc. Lower monovalent alcohols (methanol, isopropanol, etc.) are preferred.

Suitable substituted polyvalent alcohols in which one or more hydrogen atoms of the hydroxyls are substituted with an alkaline or alkaline-earth metal include monosodium glycolate ($NaO-CH_2-CH_2-OH$), disodium glycolate, mono- and disodium propylene glycolate, mono-, di- and tri-sodium glycerolates, the corresponding Li, K, and Ca derivatives, etc.

Such substituted polyvalent alcohols can be prepared by reacting an alkaline or alkaline-earth metal or hydroxide in the concentrated state with a polyvalent alcohol. For the purposes of the invention separation of such substituted polyvalent alcohol in the pure state is not necessary; the solution thereof in an excess of polyvalent alcohol can in fact be used.

The alkaline or alkaline-earth metal substituted polyvalent alcohol must be used in an amount at least equivalent to the stoichiometrical quantity necessary to neutralize the acid freed by the reaction of catalyst with the alcohol. An excess of from 1 to 10 times the stoichiometric equivalent is preferably employed.

In this manner it is possible to almost completely prevent any attack of the metal equipment, so that such equipment can be made of relatively inexpensive metal.

According to another particularly important and advantageous feature of the invention, it has been found that the presence of a certain residual amount of an alkaline or alkaline-earth compound of a polyvalent alcohol in the final polymer is particularly advantageous in so far as the stability and the coloring of the polymer are concerned. Moreover, such presence prevents or at least greatly reduces the color change in the presence of "staining" stabilizers.

This residual amount can be maintained in the polymer by reducing the amount of washing alcohol so as not to remove the compound completely, or it can actually be added before drying in the form of a solution, or by carrying out the last washing with a solution of the alkaline compound in the washing alcohol, or alternatively the alkaline compound can be added in the form of a powder to the solid polymer and the mixture then be homogenized.

The amount of alkaline polyalcoholate to be used for this purpose is from about 0.005 to 1% by weight of the polymer, and more preferably from about 0.01 to 0.5%.

The same methods of addition can be adopted when, for economic reasons, the acidity developed by decomposition of catalyst is neutralized according to another of the aforementioned methods. In such case, however, it is necessary to eliminate (by means of a careful washing treatment with alcohol) any traces of the other alkaline agents from the polymer. Here also the addition of alkaline or alkaline-earth polyalcoholate results in the advantages already mentioned, relating to stability, coloring and color change of the final polymers.

The process of the invention will be illustrated by the following examples.

*Example 1*

300 g. of ethylene glycol are treated at 60–80° C. with 50 g. of sodium (in small pieces) until the metal is completely solubilized.

The excess of ethylene glycol is distilled off under vacuum and a white crystalline product, corresponding approximately to the monosodium derivative of ethylene glycol (Na found 22.5%, Na calc. 27.4%) is thus obtained.

From the literature, however, it is known that the reaction product between sodium and glycol contains an amount of sodium lower than the stoichiometric amount.

Propylene is then polymerized at 70° C., under a pressure of 7 atmospheres, in heptane, with a catalyst of $Al(C_2H_5)_3/TiCl_3$. About 1 kg. of polypropylene thus obtained is withdrawn under an inert gas and is centrifuged (again under an inert gas) in order to remove most of the hydrocarbon polymerization solvent.

The product is then treated 3 times (each time with 3 liters) at 55° C. for 45 minutes with methanol solutions of the monosodium derivative of ethylene glycol obtained as described above and containing 8, 4 and 2 grams respectively of glycolate per liter of methanol.

After the last filtration the polymer, which still contains sodium glycolate, is dried.

After stabilization with di-tertiary butyl-p-cresol (0.2%) and calcium stearate (0.2%) the polymer is molded in a press into laminae having a thickness of 5 mm., at a temperature of 280° C. for 20 minutes.

The polymer is perfectly colorless and, after exposure to mixed sun light (supplied by a lamp according to ASTM D620–57T) exhibits no color change.

Another polymer portion is treated as described above, but the washing is carried out with pure methanol (i.e., without the addition of monosodium glycolate).

Some laminae are molded under the conditions described above in the presence of the aforementioned stabilizers.

After exposure to a sun light lamp the colorless laminae assume a colour which, depending on the exposure time, varies from clear yellow to orange-yellow.

The treatment as described above applied also to polyethylene and polybutene samples prepared with the catalytic system $TiCl_3$—$Al(C_2H_5)_3$ thus obtaining practically the same improvements in the stability of moulded laminae prepared from the treated polymer samples.

*Example 2*

Polypropylene prepared as in Example 1 and purified with methanol containing sodium methoxide is carefully washed with pure methanol and then dried.

Monosodium glycolate, prepared as described in Example 1, is then added to the dry polymer in proportions of 0.2% with respect to the polymer.

After addition of the stabilizers used in Example 1 (namely 0.2% of di-tertiary butyl-p-cresol and 0.2% of calcium stearate) the polymer is molded under the conditions described in Example 1.

No coloring of the laminae is observed, even after exposure to mixed sun light for more than 80 hours according to ASTM D 620–57T.

The same results are obtained if monosodium glycolate is added to the dry polymer as a methanol solution followed by eliminating the solvent by evaporation under vacuum.

The polymer which is free of glycolate, on the contrary, appears already to be colored after molding.

Little or no coloring, i.e., vastly less than that of the control (without addition of glycolate) is also obtained by operating under the general conditions described above but substituting the following antioxidants for 2,6-di-tertiary butyl p-cresol:

Agerite Superlite (commercial product of the Vanderbilt)
2,2′-methylene-bis (4-methyl-6-tertiary butylphenol)
Lauryl-thiodipropionate It has also been found that, by operating under the above general conditions, calcium stearate can also be eliminated, since monosodium glycolate acts also as an anticorrosive agent during molding.

*Example 3*

Monocalcium glycolate is prepared by reaction of 20 g. of metallic calcium with 500 g. of ethylene glycol at 60 to 100° C. for several hours.

The unreacted glycol is then eliminated by distillation. Polypropylene obtained as in Example 1 is then mixed with 0.2% by weight of dry monocalcium glycolate. The results obtained by subjecting the mixture to the tests described in Example 2 show that calcium glycolate behaves very similarly to sodium glycolate, i.e., the polymer remains colorless after exposure to mixed sun light, etc.

*Example 4*

Polypropylene treated and dried as described in Example 2 is then treated with a methanol solution of sodium glycolate obtained as described in Example 1, but without eliminating the excess of glycol. The amount of glycolate added corresponds to 0.2% by weight of the polymer. The polymer is then dried again.

The same advantages as described in Example 2 are again obtained, as shown from tests carried out on laminae molded from the stabilized product.

*Example 5*

The improvements resulting from the use of sodium glycolate were clearly observed when it was used in a reduced amount, i.e., 0.025% by weight of the polypropylene.

Example 6

23 g. of sodium and 95 g. of glycerol were reacted at 80–90°C. until the sodium was completely dissolved.

The product was then washed with dioxane in order to dissolve the unreacted glycerol.

The residual sodium glycerate is a straw-yellow liquid having a high viscosity.

It was dissolved in methanol and the solution was used for impregnating polypropylene previously washed first with a solution of sodium methylate in methanol and then several times with methanol (as described in Example 2) and dried, so as to obtain an addition of 0.2% of sodium glycerate based on the weight of the polymer.

The stabilizers (0.2% di-tertiary butyl p-cresol and 0.2% calcium stearate calculated on the polymer) are then added in the form of an acetone solution.

The solvents are then removed under vacuum.

Laminae molded under the previously described conditions from this material do not show any coloring, even after exposure to mixed sun light for more than 80 hours, according to ASTM D620–57T.

Variations can, of course, be made without departing from the spirit of the invention.

Having thus described the invention, what is desired to be secured and claimed by Letters Patent is:

1. A process for the purification and stabilization of high molecular weight crystalline linear polypropylene obtained with a catalyst of a metallorganic aluminum compound and a titanium halide, comprising washing the crude polypropylene with an alcohol containing dissolved therein a substituted aliphatic polyhydric alcohol in which at least one hydrogen atom of a hydroxyl group is substituted with a metal selected from the group consisting of alkali metals and alkaline earth metals, the amount of said substituted alcohol being at least sufficient to assure the neutralization of free acid developed by decomposition of said catalyst and to provide a residual amount of said substituted alcohol of from about 0.005 to 1% by weight of said polypropylene, the presence of said residual amount of said substituted alcohol serving to stabilize said polypropylene against coloration due to thermal and oxidative action in the presence of normally staining stabilizers.

2. The process of claim 1, wherein the amount of substituted alcohol is used in an amount of from 1 to 10 times the stoichiometric amount needed to neutralize said free acid.

3. The process of claim 1, wherein to the resulting purified polypropylene there is added a substituted aliphatic polyhydric alcohol in which at least one hydrogen of a hydroxyl group is substituted with a metal selected from the group consisting of alkali and alkaline earth metals in an amount of from about 0.005 to 1% by weight of said polypropylene.

4. The process of claim 3, wherein said amount is from about 0.01 to 0.5% by weight of said polypropylene.

5. The process of claim 1, wherein said substituted alcohol is monosodium glycolate.

6. The process of claim 1, wherein said substituted alcohol is calcium glycolate.

7. The process of claim 1, wherein said substituted alcohol is monosodium glycerate.

References Cited by the Examiner

UNITED STATES PATENTS

| | | | |
|---|---|---|---|
| 2,845,412 | 7/1958 | Heyson | 260—94.95 |
| 2,900,373 | 8/1959 | Martin | 260—94.95 |
| 2,919,264 | 12/1959 | Frese | 260—94.95 |
| 2,928,815 | 3/1960 | Hammer et al. | 260—94.95 |
| 2,956,983 | 10/1960 | Rindtorff et al. | 260—94.95 |
| 3,012,003 | 12/1961 | Speyer | 260—94.95 |

WILLIAM H. SHORT, *Primary Examiner.*